United States Patent Office 3,351,110
Patented Nov. 7, 1967

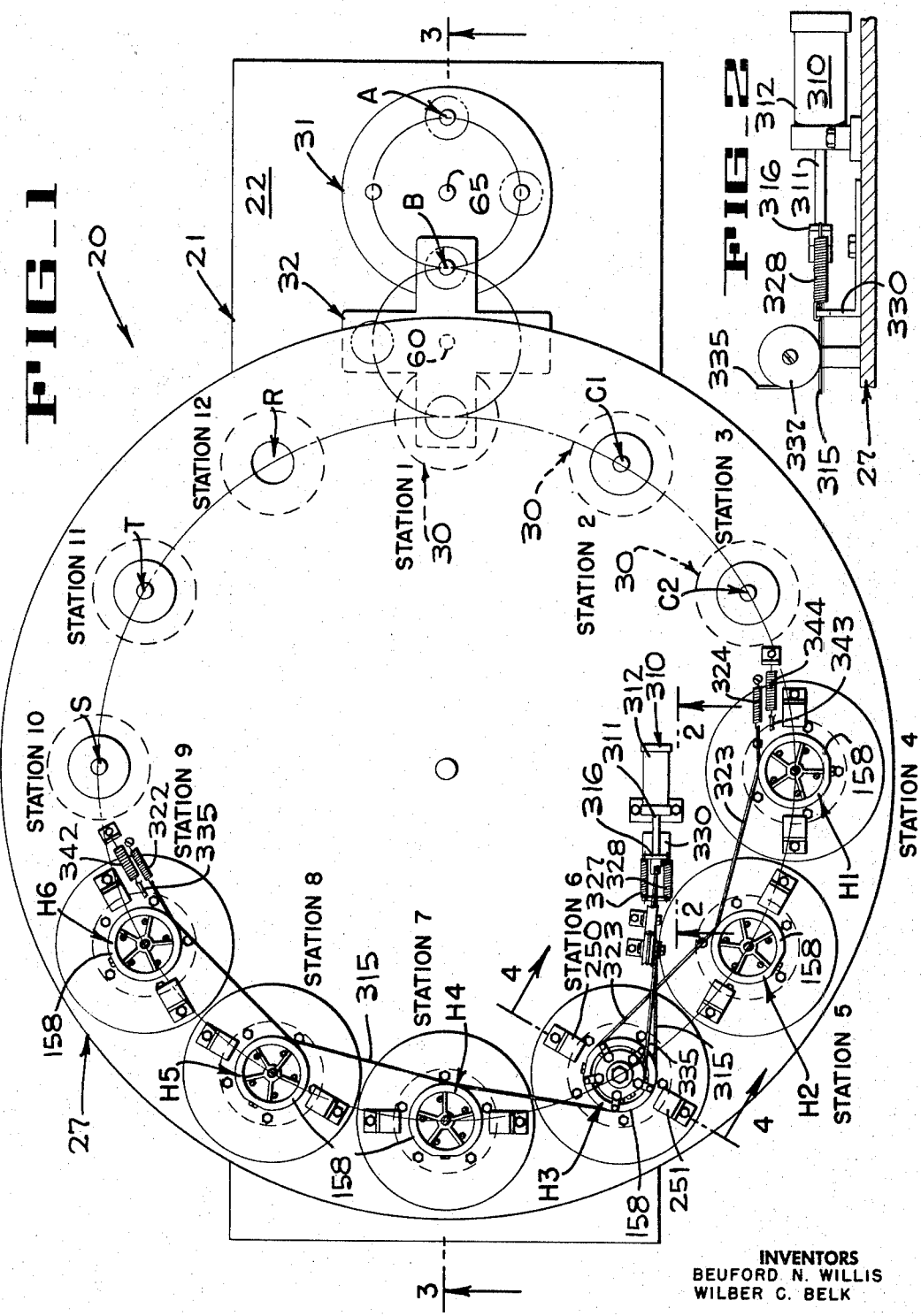

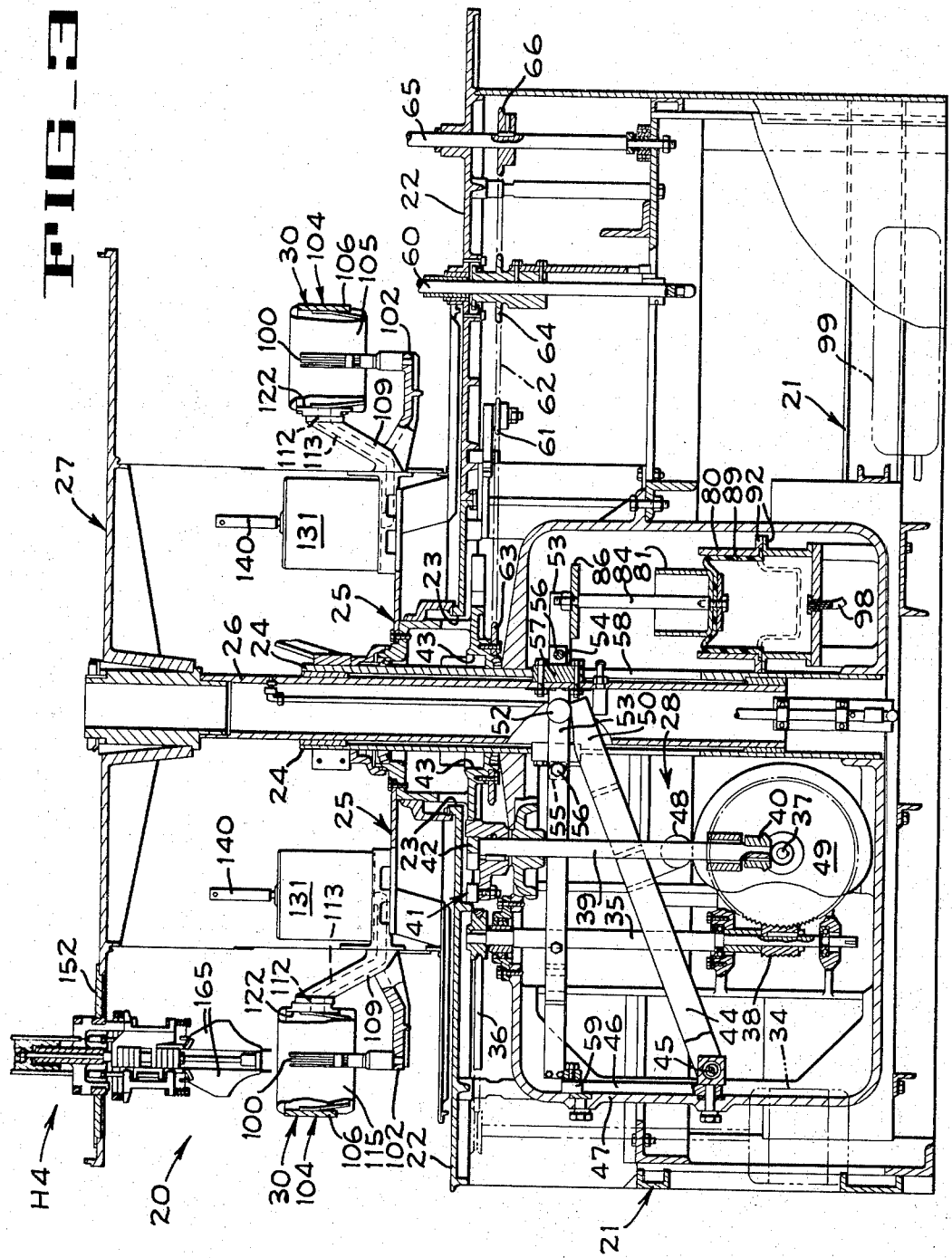

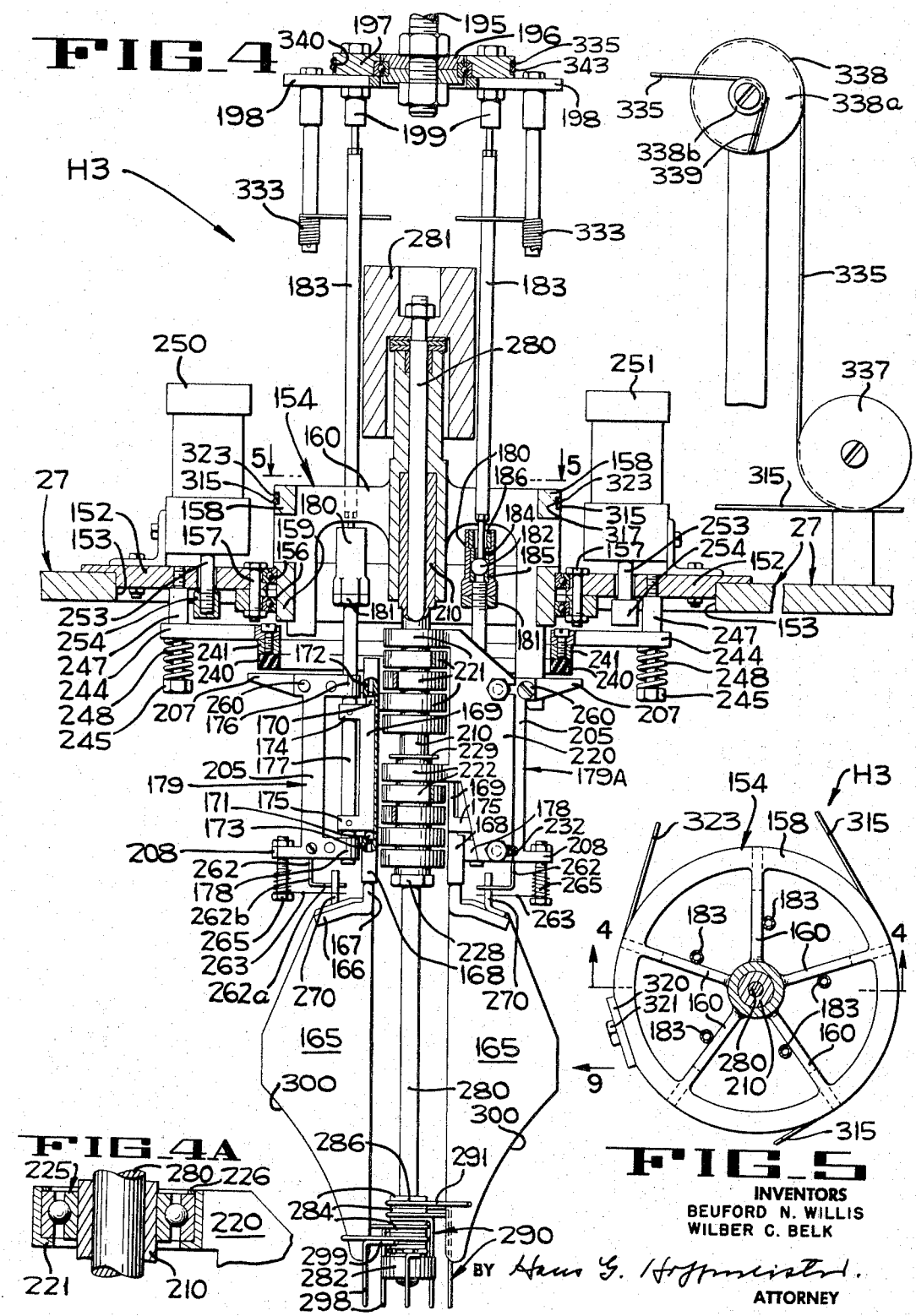

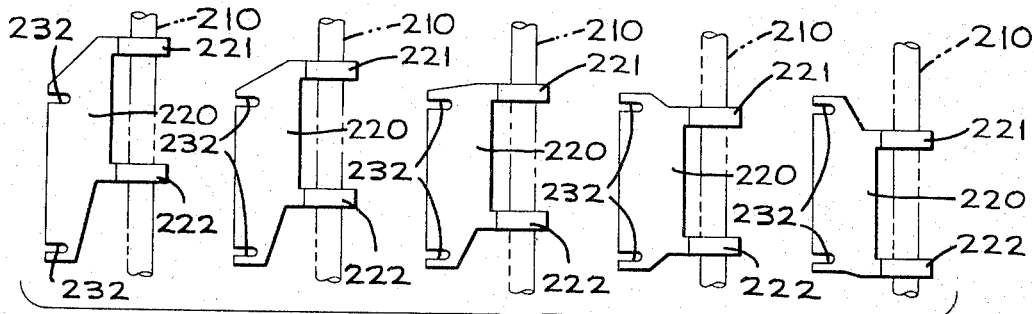
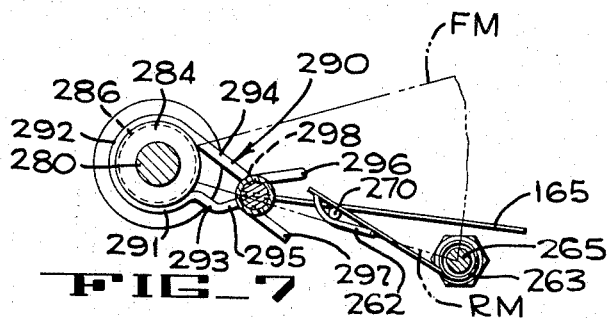
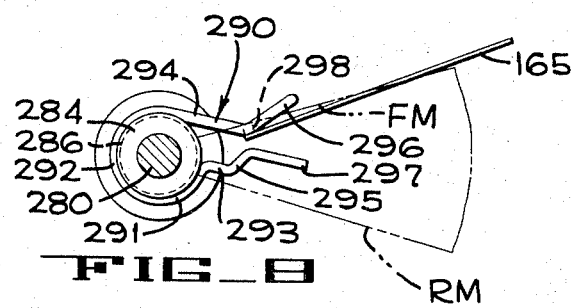
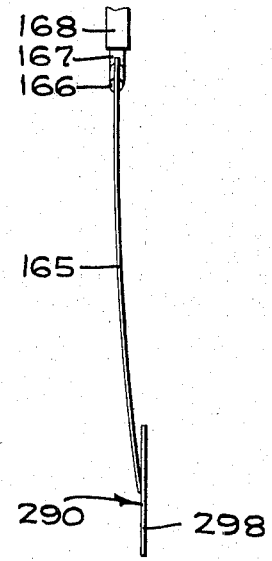
INVENTORS
BEUFORD N. WILLIS
WILBER C. BELK
BY *Hans G. Hoffmeister*
ATTORNEY

3,351,110
APPARATUS FOR CONTROLLING THE BLADES
OF A CITRUS FRUIT SECTIONIZING MACHINE
Beuford N. Willis and Wilber C. Belk, Lakeland, Fla.,
assignors to FMC Corporation, San Jose, Calif., a corporation of Delaware
Filed Oct. 22, 1965, Ser. No. 501,621
10 Claims. (Cl. 146—3)

This invention relates to apparatus for sectionizing fruit and more particularly concerns an improved mechanism for controlling the sectionizing blade of a machine for separating a citrus fruit or the like into sections.

In certain machines for sectionizing citrus fruit, sectionizing blades are moved downwardly through the fruit, which has been oriented with its stem-blossom axis disposed generally vertically, to separate the meat segments of the fruit from the adjacent radial membranes of the fruit. To effectively separate a fruit segment from a membrane, it is necessary that the blade be positioned adjacent the membrane as it moves downwardly through the fruit. The positioning of the blade is accomplished in some mechanisms by first placing a blade alongside a separate probe and then moving the probe down into the fruit a short distance. The probe and the blade are then moved laterally until the probe engages a fruit membrane, whereupon the blade is moved downwardly along the probe into the desired position adjacent the membrane. In order to effectively control the blade, it is necessary that the blade maintain contact with the probe during the joint lateral swinging movement of the blade and the probe. In prior devices the probe and the blade were swung about different centers, causing relative movement of these members and loss of control of the blade.

Accordingly, it is an object of the present invention to provide an actuating mechanism for effectively controlling the joint movement of a probe and a blade so that the blade remains in operative contact with the probe throughout their joint pivotal movement.

Another object is to provide an efficient actuating mechanism for maintaining a desired, generally vertical disposition of blade-supporting rods.

Other and further objects and advantages of the present invention will be apparent from the following description taken in connection with the accompanying drawings, in which:

FIGURE 1 is a schematic top plan of a citrus fruit sectionizing machine incorporating the apparatus of the present invention, the upper parts of five of the six sectionizing heads being broken away.

FIGURE 2 is a fragmentary diagrammatic section taken substantially along line 2—2 of FIGURE 1.

FIGURE 3 is a fragmentary diagrammatic section taken substantially along line 3—3 of FIGURE 1.

FIGURE 4 is an enlarged diagrammatic section taken along line 4—4 of FIGURE 1, particularly showing a sectionizing head and the blade control mechanism of the present invention, a portion of the right side of FIGURE 4 showing pulleys and cords, being taken substantially along line 2—2 of FIGURE 1.

FIGURE 4A is an enlarged fragmentary section taken through one of the bearing units of FIGURE 4.

FIGURE 5 is a horizontal section taken along line 5—5 of FIGURE 4.

FIGURE 6 is a view showing the mounting plates of the five blades used in the sectionizing head of FIGURE 4, each plate being mounted on the same shaft, which is shown in phantom lines.

FIGURES 7 and 8 are schematic views showing two operating positions of the sectionizing blade and probe of the present invention.

FIGURE 9 is a diagrammatic end elevation of a blade, the view being taken in the direction indicated by the arrow 9 in FIGURE 4.

The sectionizing machine 20 on which the sectionizing head of the present invention is mounted is identical to the machine disclosed in the pending application of Wilber C. Belk Ser. No. 448,572, now Patent No. 3,252,490, which is a continuation of an application Ser. No. 109,798 filed Mar. 9, 1961, now abandoned. It will be understood that said applications, both of which are assigned to the assignee of the present application, are incorporated by reference in the present application for details of construction not specifically described hereinafter.

The machine 20 comprises a base 21 (FIG. 3) having a fixed table top 22 that has a central opening 23. A stationary tubular post 24 is secured in the base and projects upwardly through the opening 23. Near the upper end of the post 24, a main turret 25 is mounted for rotation around the post, and an inner tubular post 26 is slidably journalled inside the main post 24 in suitable bushings. A circular tool carrier plate 27 is mounted on the upper end of the slidable post 26 which is arranged to be raised and lowered by a lift mechanism 28. When the tool carrier 27 is raised and lowered, it moves several fruit processing units mounted thereon into and out of engagement with fruit held in twelve fruit carriers 30 which are mounted around the periphery of the turret 25 at twelve equispaced positions designated at stations 1–12 in the plan view of FIGURE 1. The fruit processing units include a first path cutter C1 at station 2, a second path cutter C2 at station 3, six sectionizing heads H1–H6 at stations 4–9 respectively, a fruit shaker S at station 10, a spinner T at station 11, and a core remover R at station 12. There is no fruit processing unit on the tool carrier 27 at station 1 since, at this station, the only operation that takes place is the depositing of a fruit in the carrier. Also mounted above the table top 22 is a fruit feed turret 31 and a transfer turret 32.

During operation of the machine 20, fruit to be sectionized are advanced on a supply conveyor (not shown) to a point within reach of an operator who is positioned adjacent the feed turret 31 (FIG. 1). The operator places the grapefruit, one by one, on the feed turret at station A, said turret being arranged to be intermittently indexed through 90° angular movements in a clockwise direction (FIG. 1) to bring each grapefruit to a transfer station B where the fruit is automatically transferred from the feed turret to the transfer turret 32 which is also arranged to be intermittently indexed in 90° increments in synchronism with the movements of feed turret 31, but in a counterclockwise direction. The grapefruit is then moved to a station 1 of the main turret where it is deposited in one of the fruit carriers 30.

The main turret 25 is arranged to be intermittently indexed through 30° angular increments in a clockwise direction (FIG. 1) to move the grapefruit successively to the twelve stations of the machine.

The feed turret 31 and the transfer turret 32 are identical to the feed and transfer turrets of the sectionizing machine disclosed in the copending U.S. patent to H. W. Grotewold, No. 3,072,160. Since these turrets do not form part of the present invention, they will not be described in detail, however, reference may be had to the above-identified patent for a complete description of any mechanisms of the present machine that is not described herein in detail.

The drive mechanism for the machine is mounted in the base 21 and includes a motor 34 that is shown in phantom lines in sectional view FIGURE 3 since it is located ahead of the plane of this section. The motor drives a vertical shaft 35 through a belt and pulley drive 36. A horizontal shaft 37, which is driven from shaft 35 through a worm gear unit 38, drives a second vertical shaft 39 by means of a bevel gear unit 40. The vertical shaft 39 effects intermittent movement of the main turret 25 through a Geneva drive mechanism 41 which has a driven gear 42 formed on a lower hub portion 43 of the turret 25.

The lift mechanism 28 which controls the raising and lowering of the inner slidable tubular post 26 comprises a lever 44 pivotally mounted at 45 on the lower end of a vertical guide bar 46 that is bolted to a rigid wall 47 of the base 21. A roller follower 48, that is carried by the lever 44, rides along the surface of the cam 49 which is keyed to shaft 37. The lever 44 has a yoke 50 formed on its outer end which engages two diametrically opposed rollers 52 (one only being shown) that are carried by a pair of parallel bars 53. The bars 53 are secured together by two transverse bars 54 and 55 to which the bars 53 are secured by capscrews 56. A pad 57, formed on transverse bar 54, projects through an opening 58 in the stationary post 24 and is bolted to the inner slidable post 26. The transverse bar 55 is bolted to the slidable post 26 in the same manner. Thus, when the cam 49 is rotated, the lift mechanism 28 raises and lowers the slidable post 26 by means of the collar formed by the parallel bars 53 and transverse bars 54 and 55.

To prevent rotation of the post 26 while it is being raised and lowered, two rollers 59 (only being shown) are mounted on the ends of the bars 53, one roller being disposed on each side of the fixed guide bar 46.

The transfer turret 32 has a drive shaft 60 that is driven from the hub portion 43 of the main turret 25 by a chain 62 that is trained around a sprocket 63 on said hub portion and an idler sprocket 61, and engages a sprocket 64 keyed to the transfer turret shaft 60. Similarly, a drive shaft 65 of the feed turret 31 is driven by the chain 62 which is disposed around a sprocket 66 keyed to the shaft 65. The chain is trained around sprockets 64 and 66 in opposite directions so that the two turrets 31 and 32 are rotated in opposite directions. It will be evident that the main turret 25 and the feed and transfer turrets 31 and 32 are intermittently driven in timed relation through the Geneva drive 41.

The weight of the tool carrier plate 27 and its associated mechanism is carried jointly by the cam 49 and a pneumatic counterbalance mechanism which includes an open top cylinder 80, that is secured to the base, and a piston 81 that is slidable in the cylinder. A piston rod 84 is secured to a plate 86 that is bolted to the parallel bars 53, the upper end of rod 84 being disposed between the bars. A generally tubular flexible, air tight expansible and contractible air reservoir 89 is disposed within cylinder 80 below the piston 81. The reservoir should be made of a thin material that is air tight, pliable, and resistant to citric acid. A material which has been found to be satisfactory is a nylon cloth impregnated with a synthetic rubber such as nitrile. The reservoir 89 has an upper wall secured to the piston 81 and a lower annular end secured between annular flanges 92 of the cylinder. As the piston moves up and down in the cylinder, the reservoir flexes between the upper position shown in full lines to the lower dotted line position. An air conduit 98 extends through the lower wall of the cylinder and communicates with the interior of the air reservoir 89. The conduit 98 is also connected to an air supply such as the usual air bottle or container 99 in which air is maintained at a constant pressure. A manually adjustable pressure regulator (not shown) is provided to vary the air pressure to the reservoir.

When the tool carrier 27 is lowered under the control of the cam 49, air in the closed system below the piston 81 is compressed. Then, when the carrier 27 is again raised, the expanding air applies a lifting force through the bars 53 to augment the lifting force of the cam. By regulating the pressure of the air in the system, an optimum percentage of the weight of the tool carrier will be carried by the pneumatic system. It is desirable that the pneumatic system bear about 80 percent of the weight of the tool carrier 27. With such an arrangement, the machine operates smoothly, and the cam 49 and associated parts are small enough to be efficiently arranged in the base.

The construction and operation of the several fruit carriers 30 are disclosed in the above-mentioned application Ser. No. 448,572. In general, each carrier 30 comprises a prong unit 100 (FIG. 3) that is mounted at the outer end of a mounting bracket 102 which is bolted to the main turret 25. A pneumatic fruit holder 104 is disposed around each prong unit for gripping the fruit during the several sectionizing operations. Each holder comprises a rigid ring 106 which is bolted to the upper end of an upwardly projecting arm 109 of the mounting bracket 102. The ring 106 is provided with an air inlet opening 112 which communicates with a passage 113 formed in the arm 109. A tubular fruit gripper member 115, which is made of thin pliable sheet material, such as the material from which the air reservoir 89 is made, has its upper end clamped around the upper edge of the ring 106 by a clamping band. The lower end of the tubular member 115 is clamped around the lower end of ring 106. Thus, the tubular gripper member cooperates with the inner wall of ring 106 to define an annular air chamber 122 which communicates with the air inlet opening 112.

Air is forced into the inflatable gripper through the passage 113 in the bracket 102 by the downward movement of a weighted piston (not shown) that is disposed for vertical movement in a cylinder 131. The cylinder is mounted on a radially inner portion of the bracket 102, and has a lower open end that communicates with the passage 113 in the arm 109. The piston in the cylinder 131 is secured to a rod 140 which projects out of the cylinder. During operation of the machine, a mechanism at station 10 grips the rod 140 and raises the piston, causing the air in the pneumatic gripper to be drawn back into the cylinder 131. The rod 140 is latched in this upper position and then, when the carrier is again moved to station 2, the rod is unlatched, permitting the piston to move downwardly and causing the gripper to be inflated into gripping contact with the fruit on the associated prong unit 100. The details of the cylinder 131, the lifting, latching and unlatching mechanisms are described in the above mentioned patent.

Means are provided in machine 20 for cutting a path around the axis of the fruit at the blossom end to completely rupture and remove the peripheral membrane of the fruit and to cut short paths between adjacent radial membranes of the meat segments so that the probes of the sectionizing blades of the six sectionizing heads H1–H6 may move laterally, and efficiently seek out the adjacent radial membrane. These pathcutting mechanisms are also described in detail in said patent.

After the cutting mechanisms have made arcuate paths in the end of the grapefruit, the grapefruit is moved to a position under the first head H1 of the six sectionizing heads of the present invention. The six heads are substantially identical; the only difference between the various heads is that the orientation of their parts is varied so that the blades of each head will penetrate a part of the fruit not penetrated previously by a preceding head. Also, some of the heads are arranged so that the blades and probes move in one direction around the axis of the head to seek out forward radial membranes of the grapefruit while the blades and probes of other heads move rearwardly to seek out rear radial membranes of the fruit. However, the following description of the head H3 shown in FIGURES 3 and 4 will disclose the operation and construction of all of the six heads.

Each head comprises an annular support plate 152 that is disposed in an opening 153 in the tool carrier 27 and is secured thereto by capscrews (not shown). A blade actuating member 154 is rotatably supported in an opening in plate 152 by a pair of bearing assemblies 156 that are held in place on the annular plate 152 by bolts 157. As best seen in FIGURES 4 and 5, the blade actuating member 154 is in the form of a spider and comprises an upper grooved ring 158 and a lower ring 159, both rings being formed integral with five equi-spaced radial webs 160.

Five sectionizing blades 165 are mounted in each head, each blade being secured at its upper end to a leg 166 of a rod 167 that is welded to a tube 168. The tube 168 is cut open at one side to receive one side portion of a blade carrier 169, and the conical points of pivot pins 170, 171 carried by this side portion of the blade carrier are rotatably engaged in upper and lower bearings 172 and 173 respectively. The lower bearing 173 is secured in fixed position in the lower end of tube 168 while the upper bearing 172 is slidably adjustable in the upper end of tube 168 in the manner described in the above-mentioned patent. Thus, each blade is freely pivotable relative to its blade carrier. The blade carrier 169 has two arms 174 and 175 which are secured by setscrews to a tube 177, that is slidable in two spaced arms 176 and 178 of a blade control member 179. At its upper end, the tube 177 is threaded into the lower end of an internally threaded sleeve 180 and locked thereon by a nut 181. A ball pivot 182, which is secured to a tubular rod 183, is disposed in the sleeve between two seat members 184 and 185. A retainer screw 186 locks the ball in the sleeve and permits limited swinging of the ball pivot.

During operation, each blade is rapidly reciprocated in a vertical direction by means of a mechanism fully described in the above mentioned patent. In general, the mechanism includes a motor mounted on top of the tool carrier 27 and drivingly connected to a plurality of horizontal shafts. A plurality of eccentrics are connected to the shafts, each eccentric being secured to a member 195 (FIG. 4) that is substantially aligned with the axis of spider 154 and with the axis of a fruit carrier 30 positioned therebelow and is arranged to reciprocate vertically incident to rotation of the associated shaft. A plate 196, that is mounted on the lower end of the vertically reciprocating member 195, supports and rotatably journals a ring 197. A plate 198 in the form of a star having five points is secured to ring 197 and mounts the upper ends of the five blade-carrying tubular rods 183 in a symmetrical pattern around the axis of member 195 for universal pivoting movement in joints 199.

Each blade control member 179 includes a rigid strap 205 connecting the two arms 176 and 178, a flat-top extension 207 of arm 176, and an extension 208 of arm 178. Each blade control member is supported from a central tubular shaft 210, the upper end of which is secured, as by a press fit, in a central cylindrical opening in the blade actuating member 154. To disclose the manner in which each blade control member is supported from the central shaft 210, attention is called to the blade control member identified in FIGURE 4 by reference numeral 179A. Member 179A is rotatably supported on shaft 210 by means of a vertical plate 220 which is secured by capscrews to the control member and is provided with two integrally formed, spaced, upwardly opening cylindrical cups 221 and 222. An anti-friction bearing assembly 225 (FIG. 4A) is mounted in each cup, the outer race of the bearing being locked in the cup by peening a retainer ring 226 onto the cup, and the inner race being tightly disposed around shaft 210. The lower cup 222 is locked against axial movement on shaft 210, along with the lower cups of the other four vertical plates 220, by a nut 228 that is threaded on the lower end of shaft 210 and urges the five lower cups upwardly toward a stop member 229 which is in the form of a U-shaped washer slidably disposed in a groove (not shown) in the shaft 210. Spacer washers may be disposed between the several adjacent lower cup members, the nut 228, and the stop washer 229 where desired. Since the lower cup is locked in supported relation on the shaft, the upper cup 221 need not be supported on shaft 210. Since ten bearings must be accommodated on the shaft 210, the five vertical plates 220 must be of slightly different design as seen in FIGURE 6. It will be noted that, while the bearing retaining cups 221 and 222 are at different elevations, the slots 232 that receive the capscrews for securing the plates to the blade control members 179 are at the same elevation. Thus, all the members are disposed at the same elevation, and the upper flat surface of all five flat-top extensions 207 are adapted to be engaged simultaneously by an annular brake ring 240 that is made of a material such as rubber and is mounted on a rigid ring 241 which, in turn, is secured at two diametrically opposed positions on horizontal support arms 244. Each arm has an aperture at its outer end through which a capscrew 245 extends, the screw being threaded into the fixed plate 152. The arm 244 is disposed between a spacer sleeve 247 on the screw and a coil spring 248, that is disposed around the capscrew between the head of the screw and the underside of the arm 244. The spring urges the arm upwardly against the sleeve 247 which acts as a stop.

The brake ring 240 is urged downwardly against the flat top of the blade control member by two solenoid-controlled air cylinders 250 and 251 which are mounted on the plate 152, each cylinder having a piston rod 253 that carries a block 254 at its lower end. At certain intervals the air cylinders are actuated simultaneously, causing the blocks 254 to move downwardly, engage the arms 244, and force them downwardly to bring the brake ring 240 into engagement with the extensions 207 of all five blade control members.

As seen in FIGURE 5, each of the five blade support rods 183 of head H3 is disposed closely adjacent one of the webs 160 of the blade actuator spider 154 on the clockwise side of the web. The exact position of each rod relative to the web can be varied by means of a setscrew 260 (FIG. 4) which is threaded through the upper arm 176 of each blade control member 179 and engages the flat face of the web with its end surface. Since the tube 177, connected to the lower end of each blade-carrying rod 183, is snugly disposed in openings in the arms 176 and 178 of the associated blade control member 179, the blade will assume a position relative to the web depending upon the setting of the setscrew 260 which may be of the Nylock, self-locking type.

The position of each blade 165 relative to the associated blade control member 179, and therefore relative to the axis of shaft 210, is determined by a positioning pin 262 which is adjustably secured in a generally vertical aperture in the lower arm 178, and by a torsion spring 263 that is anchored on a bolt 265 secured to the extension 208 of arm 178. As shown diagrammatically in FIGURE 4 and diagrammatically in FIGURE 7, a post 270 which is secured to and projects upwardly from each blade, is disposed between the curved lower end 262a of the positioning pin 262 and the spring 263. By loosening the capscrew that locks the pin 262 in the blade control member 179, the pin can be rotated about its vertical shank 262b as an axis to move post 270 and cause the blade to pivot about the pivot pins 170 and 171 (FIG. 4). The spring 263 will resist pivoting of the blade when it is adjusted in one direction and will cause the blade to pivot when it is adjusted in the other direction, keeping the blade post 270 in contact with the pin 262.

Referring to FIGURE 4, it will be noted that the plate 220 is a flat planar member and that the face of the control member 179, that is secured to the plate 220, is also flat. Accordingly, if the plate 220 were disposed vertically, the member 179 would be vertical and the guide holes in the arms 176 and 178 would hold the blade-support tube 177 on a generally vertical axis. However, in the present arrangement, in order that the blade can effectively maintain its contact with the membrane as it moves downwardly along the membrane even if the membrane is inclined relative to a true vertical, due to its natural formation or to the manner that the fruit is positioned in the fruit carrier, the blade is supported at about two degrees to the vertical. This slightly inclined position is attained by canting the plate 220 about two degrees relative to the axis of its aligned, cylindrical bearing cups 221 and 222 which, as mentioned above, are integrally formed with the plate.

Also, the planes of the plates 220 and the control members 179 relative to a radial plane extending outwardly from the axis of shaft 210 should be chosen so that the position of the blade is a few degrees, as for example 5 degrees, away from a radial plane, substantially as shown in FIGURE 7, so that it can assume an initial position partially overlying a fruit membrane, as will be explained presently.

Each head includes a central hold-down rod 280 which is mounted for sliding movement in a central bore of the central shaft 210. A weight 281 is mounted on the upper end of the hold-down rod 280, and the engagement of the weight with washers on the upper end of the spider 154 limits the downward movement of the rod. A cylindrical fruit-contacting plug 282 is secured by a capscrew to the lower end of the hold-down rod, and five stainless steel anti-friction bearing units 284 are disposed in superposed relation on the rod above the plug 282, each unit having an annular groove 286 on its exterior surface. A thin shim (not shown) is disposed between each pair of adjacent bearing units to assure freedom of rotation of each bearing unit.

A probe 290 is associated with each sectionizing blade, each probe being mounted on one of the bearing units 284. Each probe has an upper looped end 291 (FIG. 7) which is disposed in the annular groove of its associated bearing unit and is made of resilient material so that it grips the bearing and holds itself in fixed position thereon. Each looped end 291 has a hairpin configuration made up of a partial circular portion 292, two generally parallel spaced sections 293 and 294, two other generally parallel sections 295 and 296, and an end section 297. The probe also has a fruit penetrating section made up of a vertical prong 298 which has an upper, right angle portion 299 welded to the underside of the hairpin section 294. The lower end of the prong is slightly flattened so that it will not cut into or penetrate the membrane of the fruit.

Since the bearing units that carry the probes are mounted in superposed relation, the prong portion 298 of each of the five probes is of a different length than the others as seen in FIGURE 4, the probe associated with the uppermost bearing unit having the longest prong. Accordingly, the lower ends of all five probes are in substantially the same horizontal plane and all of the probes will engage the fruit at the same time and will penetrate the same distance down into the fruit when the sectionizing head is moved downwardly.

It should be particularly noted that the probes swing with the outer race of the associated bearing around the axis of central shaft 210 as does the sectionizing blades 165.

A grapefruit is made up of a plurality of sections disposed generally parallel to the stem-blossom axis. In cross-section each section is generally V-shaped as shown in phantom lines in FIGURES 7 and 8 with the apex of the V adjacent the axis of the fruit and with the walls of the V defined by two membranes which are disposed generally radially of the axis. For convenience, one membrane is designated as a rear membrane RM and the other membrane is identified as a forward membrane FM. During each downward movement of the tool carrier, each sectionizing blade is adapted to move down into a grapefruit section along one of the membranes to separate the meat of the section from the membrane. In order that the blade be in a position close to the membrane before it moves down through the grapefruit, each blade and its associated probe is pivoted a predetermined number of degrees around the axis of shaft 210 to a preliminary, spring loaded cocked position. Then after the head has been lowered a distance sufficient to bring the lower end of the probe about 5/8 of an inch down into the grapefruit at a point a short distance from the apex, the blade is released from its cocked position and the probe moves through the grapefruit section to "find" the adjacent membrane. Since the blade is disposed between the arms of the probe, when the probe contacts a membrane, the blade is in the desired position relative to the membrane which is substantially the position shown in FIGURE 8 wherein blade 165 is shown as overlying the membrane FM at a slight angle relative to the membrane. When the blade is subsequently moved downwardly, the edge 300 (FIG. 4) of the blade engages the upper edge of the membrane, causing the blade to be pivoted slightly on its pivot pins 170 and 171, and thus the blade automatically assumes a position closely adjacent the membrane as it moves downwardly to separate the membrane from the meat section.

In FIGURE 7, the cocked position of one of the five blades of head H3 and its probe is illustrated, while in FIGURE 8 the uncocked or released position is shown, the prong portion 298 of the probe having moved into engagement with a membrane FM.

The blades and probe are moved to the cocked position by rotating the spider 154. In FIGURE 5 it will be noted that each blade carrying rod 183 is disposed alongside a web 160 of the spider. Accordingly, when the spider is rotated clockwise, the webs will push the rods 183 and the attached blades a predetermined distance to the cocked position. Counterclockwise rotation of the spider 154 will move the webs away from the blades, permitting the blades to move away from cocked position. Rotation of the spider 154 is effected by means of an actuating mechanism that includes a solenoid controlled air cylinder 310 (FIGS. 1 and 2) that is mounted on top of the tool carrier 27 and has a piston rod 311 arranged to be withdrawn into the housing 312 when the cylinder is energized. A cord 315 is attached at one end to a crosshead 316 that is secured to the piston rod and, as seen in FIGURE 4, is disposed in a groove 317 in the upper ring 158 of the spider. A clamping plate 320 (FIG. 5), which is secured to a flattened portion of the ring 158 by a capscrew 321, clamps the cord to the ring so that a pull on the cord in one direction causes clockwise rotation of the spider of head H3. The cord continues clockwise around the ring 158 of head H3 and then is wrapped counterclockwise around the rings 158 of the spiders of heads H4, H5 and H6 to which it is clamped by clamping plates identical to clamp plate 320. The end of cord 315 is connected to a spring 322 that is anchored to tool carrier 27. A second cord 323 is clamped by clamp plate 320 to the ring 158 of head H3, and is trained in a clockwise direction around the grooves 317 of the spiders of heads H1 and H2. This cord is clamped to the spiders of heads H1 and H2 and has its end connected to a spring 324 that is anchored on the tool carrier 27. Accordingly, when the air cylinder 310 is energized, cord 323 is pulled by the crosshead, causing the counterclockwise rotation of the spiders of heads H1, H2 and H3 and the clockwise rotation of heads H4, H5 and H6. As mentioned above, this action causes uncocking of the blades due to the fact that the spider webs move away from the blade support rods. As the above uncocking operation takes place, the springs 322 and 324 are tensioned.

When the air cylinder 310 is subsequently deenergized, two springs 327 and 328 (FIG. 1) which are connected between the cross-head 316 and a fixed bracket 330 (FIG. 2), pull the piston rod outwardly of the housing to release the tension on the cords 315 and 323. The springs 322 and 324 now act to rotate the spiders of H1, H2 and H3 in a clockwise direction, and the spiders of H4, H5 and H6 in a counterclockwise direction. A plurality of torsion springs 333 (FIG. 4), one of which engages the upper end of each blade-supporting rod 183 and is anchored on a post depending from star plate 198, urges the blades and their probes in a direction to follow the associated webs of their spiders. For example, in FIGURE 4, the five springs 333 of head H3 urge the blades counterclockwise. The blades do not travel as far as the webs, however, since they stop their movement when the probe engages the side surface of the fruit membrane that it is seeking. The stroke of the air cylinder is so chosen that the angular movement of the spider is greater than the maximum desired angular movement of the probes. It has been found that an angular movement of about 54 degrees is satisfactory for commercial operation on grapefruit.

While the rods that support the blades from the star plate 198 are mounted in universal joints and will permit swinging of the lower ends of the rods relative to the upper ends, it is evident that if the upper ends of the rods are held stationary during this swinging movement, each rod will assume an inclined orientation that is unsuited for the rapid vibrating movement that will subsequently take place. In the present mechanism means is provided for also rotating the star plate 198, that supports the upper end of the blade-supporting rods 183, a short angular distance in the same direction as the spider. A cord 335 (FIG. 4) which is connected to the crosshead 316 alongside cord 315, is trained around pulleys 337 and 338 that are mounted on brackets (FIG. 1) of the tool carrier 27. This second cord is disposed in a groove 340 in the plate 197 (FIG. 4) and is locked in the groove by a clamping plate similar to clamping plate 320. It is to be noted that the pulley 338 is a double pulley having a large wheel 338a and a wheel 338b that has a diameter that is considerably less than the diameter of the wheel 338a. The cord 335 is first trained over large wheel 338a, passed through a slot 339 in the side wall of wheel 338a, and is trained around smaller pulley 338b. Accordingly, the amount of movement of the portion of the cord leaving small wheel 338b is only a fraction of the movement of the portion of the cord entering the large wheel 338a. The diameters of the wheels 338a and 338b, the diameter of the groove 340 of plate 197, and the diameter of the groove in the spider 154 are so chosen that the angular movement of the star plate 198, which is bolted to plate 197, is approximately one-half the angular movement of the spider. The cords 335 is operatively connected to the plates 197 of the heads H4, H5, H6 in the same manner as the cord 315 is connected to the spiders of those heads, and a spring 342 (FIG. 1) that is anchored on an elevated bracket of the tool carrier 27 is secured to the end of cord 335. Also, a spring-loaded second cord 343 is connected from the plate 197 of head H3 to the plates 197 of heads H2 and H1 in the same manner as the cord 323 is connected to the spiders of those heads and is connected to a spring 344 mounted on an elevated bracket. Accordingly, when the air cylinder 310 is energized and the spiders move away from cocked position, the star plates and the blades carried thereby also move away from cocked position and they do not come to rest until the probe engages the fruit membrane it is seeking. It will be evident that, since the upper end of the blade-supporting rod moves, the final inclination of the blade-supporting rods relative to the vertical will be less than it would be if the upper end remained entirely fixed during movement of the blades. By the above arrangement, movement of the rods away from the vertical during the membrane seeking step is minimized.

It will be noted that when the star plate 198 and the spider 154 are moved to cocked position, the star plate determines the position of the upper ends of the blade-supporting rods while the webs of the spider determine the position of the lower ends of the rods. The relative rotary positions of the plate 198 and the spider 154 may be adjusted so that, when the head is cocked, the blade support rods will be moved to a completely vertical position or to one slightly inclined relative to the vertical. If it is assumed that the position of each rod is vertical, as mentioned above, the rod will maintain the vertical orientation during the membrane-finding operation until the probe engages the membrane, and the final orientation of the rod will be vertical or slightly inclined relative to the vertical. The blade itself is made of very thin stock which can be easily bent. Accordingly, it has been discovered that, when the probe engages a fruit membrane and is substantially stopped, the momentum of the spring-loaded blade support rod tends to continue the movement of the rod and thereby causes the blade to bend. This overtravel of the rod is provided by imparting a bend to the blade itself as seen in FIGURE 9. With a pre-bowed blade, the probe engages the membrane and then the momentum of the rod causes the rod to overtravel and move the blade to a substantially vertical position. It has been found that if a blade, that is approximately six and a half inches in length from its tip to the point at which it is connected to the rod 167, is bowed so that its lower end is displaced about 3/32 inch from the original plane of the blade, it will move to a substantially vertical position when the rod overtravels as mentioned above.

Since the overtravel of the rod causes the lower end of the rod to move past the desired final position and thus cause an undesired final inclination of the rod, the spider and the star plate may be adjusted so that the lower end of the rod assumes a cocked position that is from 1/4 to 3/8 inch ahead of the position it would assume if there were no overtravel.

The brake ring 240 is moved into engagement with the blade carriers 179 at a a predetermined time immediately after the probes have found the fruit membranes so that the blade will not move away from the membrane but will only pivot on its axis. The actuation of the air cylinders 250 and 251 that actuate the brake ring, as well as the actuation of the air cylinder 310 that controls the blade uncocking mechanisms is under the control of a camshaft (not shown) that is driven from the vertical shaft 39 (FIG. 3), as described in Patent No. 3,252,490. It will be understood that each of the solenoid-controlled air cylinders 250, 251 and 310 consists of a pneumatic power cylinder, valve means arranged to control the flow of pressurized air to and from the cylinder, and a solenoid for shifting the various valve elements. The solenoids are all controlled from a central cam and switching unit (not shown) that includes the abovementioned camshaft. A separate cam is mounted on the camshaft for each of the above-mentioned solenoids and for the solenoid of each of several other mechanisms of the machine, and each cam actuates a separate microswitch that is electrically connected to the solenoid. Since the camshaft is driven from the vertical shaft 39, it is evident that the actuation of the various air cylinders takes place in timed relation with the indexing of the turret and with the vertical movement of the tool carrier 27.

During the operation of the machine, while the main turret is stationary and the tool carrier 27 is moved downwardly, a fruit is positioned within a fruit carrier 30 at station 1 (FIG. 1) and impaled on the prong unit 100 (FIG. 3) of the carrier. When the tool carrier is next raised, the turret is indexed to move the fruit in the carrier to station 2 where, as the tool carrier is again lowered, the cutting mechanism C1 cuts arcuate paths in the grapefruit near the apices of several of the V-shaped sections of the grapefruit. At station 3, the cutting mechanism C2 cuts more arcuate paths in the grapefruit. When the grapefruit is positioned at station 4 and while the tool carrier 27 and the sectionizing head H1 is in its raised position, the air cylinder 310 is deenergized, causing the spider and the star plate of head H1 to rotate clockwise under the urgency of springs 322 and 324 and to move the blades to cocked position. Then, as the tool carrier moves downwardly the probes enter the grapefruit and the weighted hold down rod comes to rest on the top of the fruit. When the probes are approximately ⅝ inch down into the grapefruit, the control cam 49 (FIG. 3) permits a short interruption in the downward movement of the head, and the air cylinder 310 (FIG. 1) is energized, rotating the spider counterclockwise and rotating the star plate counterclockwise. Accordingly, the probes move along the paths previously made by cutters C1 and C2 until the probes engage the membranes. Since the torsion springs 333 provide a resilient backing for the rods, each blade is permitted to stop as soon as a membrane is contacted even before the star plate has stopped its movement. On the other hand, if a membrane has not been reached by the time the star plate stops, each torsion spring 333 will continue the movement of the blade by pivoting the rod 183 relative to the star plate until a membrane is reached.

When each probe has reached a membrane, the air cylinders 250 and 251 are energized, to lock the blades in fixed position relative to the tool carrier while permitting the blades to pivot about their pivot pins 170 and 171. As the tool carrier continues to move downwardly, the lower edge of each blade engages the membrane, which it overlies, and is progressively turned to a position alongside the membrane. When the blades are about one-third of the way down through the grapefruit, the air cylinders 250 and 251 are deenergized and the brake ring 240 is raised out of engagement with the blade carriers 179. After the blades have moved all the way down through the grapefruit and have separated the meat sections from the membranes, the tool carrier is raised to lift the blades out of the grapefruit. When the tool carrier is in raised position, the turret is indexed again to bring the grapefruit to station 5 under head H2. The above-described blade-cocking and uncocking operations are repeated as the tool carrier moves down again.

It is to be particularly noted that, during the cocking and uncocking operations, the probes and the associated blades move together and that they move about the same axis, namely, the axis of shaft 210. Further, it will be evident that, since the blades pivot about shaft 210, they can effectively maintain their substantially radial position relative to the axis of the shaft which corresponds approximately to the axis of the grapefruit in the fruit carrier of the turret.

Having thus described the invention, what is claimed as new and desired to be protected by Letters Patent is:

1. In a sectionizing machine, a support structure, a plurality of sectionizing heads mounted in said support, each of said heads being provided with a support member defining a vertical axis, blade support means mounting a plurality of rods in upright position around said axis; a sectionizing blade mounted on the lower end of each rod and extending outwardly from said axis; and a blade-actuating mechanism comprising a spider mounted for rotation in said support structure adjacent the rods of each head and having a web adjacent each of said rods, a flexible drive member encircling said spider in driving engagement, and power means for exerting a pull on said drive member in a particular linear direction to rotate said spider in a predetermined rotary direction and move the webs of the spider into engagement with said rods.

2. The mechanism of claim 1 wherein said power means is a spring mechanism connected between said flexible drive member and said support structure.

3. The mechanism of claim 1 wherein said flexible drive member is trained around certain of said spiders in a clockwise direction and the remainder of said spiders in a counterclockwise direction.

4. The mechanism of claim 1 including a second power means connected to said flexible drive member for exerting a pull on said member in a direction opposite to said predetermined linear direction to rotate said spider in a rotary direction opposite to said predetermined rotary direction to move said webs away from said blade-carrying rods, said two power means being actuatable alternately.

5. The mechanism of claim 4 wherein said second power means is a power cylinder connected to said two flexible drive members, and wherein said first power means is a spring mechanism arranged to be tensioned when said second power means is activated.

6. The mechanism of claim 4 including spring means operatively connected to said rods to urge said rods in a direction to follow said webs when said spider is rotated in said opposite rotary direction by said second power means.

7. The mechanism of claim 1 including a rotary plate mounted in concentric spaced relation in said support above each spider in supporting relation to the blade-carrying rods, and a second flexible drive member connected between said rotary plate and said power means whereby actuation of said power means exerts a pull on said spider and said rotary plate to rotate said spider and plate in the same angular direction about their common axis.

8. The mechanism of claim 7 including a stepped pulley receiving said second flexible member thereon to reduce the amount of linear movement of said member whereby said rotary plate is rotated through an angular distance less than the angular distance traversed by said spider.

9. The mechanism of claim 7 including springs means connected to both of said flexible drive member and arranged to be tensioned when said power means is energized whereby, when said power means is de-energized, said spring means will rotate said spider and said rotary plate in an opposite direction.

10. The mechanism of claim 1 wherein said blade support means comprises a rotary plate mounted in said support above said spider and concentric therewith, a plurality of posts secured to and depending from said rotary plate, a torsion spring disposed around each post, each spring having a portion in engagement with one of said rods and arranged to urge said one rod toward the associated web of said spider.

References Cited

UNITED STATES PATENTS 2,560,128   7/1951   Polk et al. _____ 146—3

W. GRAYDON ABERCROMBIE, *Primary Examiner.*